(No Model.)  5 Sheets—Sheet 2.

R. B. LITTLE.
COAL ELEVATOR AND CONVEYER.

No. 287,140.  Patented Oct. 23, 1883.

Attest:  
Philip F. Larner  
Howell Bartle

Inventor:  
Robert B. Little  
By Wm C Wood  
Attorney (No Model.) 5 Sheets—Sheet 3.

R. B. LITTLE.
COAL ELEVATOR AND CONVEYER.

No. 287,140. Patented Oct. 23, 1883.

Attest:
Philip T. Larner
Howell J. Bartle

Inventor:
Robert B. Little
By Wm E. Mort
Attorney.

(No Model.) 5 Sheets—Sheet 4.

R. B. LITTLE.

COAL ELEVATOR AND CONVEYER.

No. 287,140. Patented Oct. 23, 1883.

Attest:
Philip F. Larner
Howell Battle

Inventor:
Robert B. Little
By Wm C. Wood
Attorney (No Model.) 5 Sheets—Sheet 5.

R. B. LITTLE.
COAL ELEVATOR AND CONVEYER.

No. 287,140. Patented Oct. 23, 1883.

Attest:
Philip F. Larner
Howard Bartle

Inventor:
Robert B. Little
By _____ Attorney.

N. PETERS, Photo-Lithographer, Washington, D. C.

UNITED STATES PATENT OFFICE.

ROBERT B. LITTLE, OF PROVIDENCE, RHODE ISLAND.

COAL ELEVATOR AND CONVEYER.

SPECIFICATION forming part of Letters Patent No. 287,140, dated October 23, 1883.

Application filed April 19, 1883. (No model.)

*To all whom it may concern:*

Be it known that I, ROBERT B. LITTLE, of the city and county of Providence, in the State of Rhode Island, have invented certain new and useful Improvements in Coal Elevators and Conveyers; and I do hereby declare that the following specification, taken in connection with the drawings furnished and forming a part of the same, is a clear, true, and complete description of my invention.

The main objects of my improvements are to economically and quickly unload coal from vessels lying at dock, and to deposit it at points more or less remote from a vessel with great rapidity and with minimum liability of impairing the value of the coal by breakage. Although said improvements are of value for use in local trade, their prime value will be realized in connection with coal - docks especially organized with reference to the transfer of cargoes of coal to other vessels or to railroad cars, whether directly or by means of intermediate bins or pockets.

Coal - handling apparatus under various names, and varied in construction and operation, has heretofore been devised by myself and others; but I have now so devised and organized apparatus for that purpose as to enable, at a less cost than has, as I believe, heretofore been possible, the lifting of coal from a vessel conveying it at will to any desired point, and lowering and depositing it without any liability of injury thereto from breakage. Heretofore stationary swinging cranes of various kinds have been employed which could raise coal from a vessel's hold and convey and deposit it, by the dumping of a bucket, at any desired point limited to the area traversed by the arm of the crane. Elevated inclined and also level tramways, with steam windlasses, draft-chains, buckets, and bucket-trucks, have also heretofore been employed in various organizations for hoisting and conveying coal to a fixed point of delivery, the coal falling therefrom upon a pile; but (as with the cranes before referred to) the points of deposit are limited in this class of apparatus to the longitudinal space beneath the draft-chain or its path between the vessel and the steam-windlass, and the length of said chain is also practically limited, because the operator of the steam-windlass, which is stationary, should have beneath his eye, for constant observation, the entire field of operations from the hatchway of a vessel to the point of deposit by the apparatus. With such apparatus its place of discharge is always fixed and predetermined, and when it is desirable to vary the point of final deposit, a stopping device must be changed in position; or variable chutes have been employed for diverting the falling coals in various directions from the fixed point of discharge at which the coal is released from the buckets employed in connection with such hoisting and conveying apparatus. Elevated tramways with endless traction cables or chains have also been employed in combination with trucks carrying hoisting mechanism, the whole being so organized that said cable propels the truck and also operates the hoisting devices; but with such apparatus separate trucks cannot be independently and simultaneously operated on the same tramway by the endless cable, and the safety of the entire apparatus depends upon the proper operation of a second endless hand cable, by which the movements of the main cable are reversed, and with a tramway of considerable length it is obvious that the slack necessarily incident to both cables cannot be conducive to that prompt and accurate handling of the trucks which I seek to obtain.

With apparatus embodying the main features of my invention there is practically no limit to the range within which the coal, after being hoisted, can be conveyed and deposited, the coal need never be exposed to breakage by falling, no variations in adjustment of the hoisting, conveying, and dumping apparatus are requisite, and the operator in charge has at all times the entire working or active portions of the apparatus directly under his eye and completely within his control.

In my present apparatus I have, as I believe, for the first time combined with an elevated tramway arranged to overhang a floating vessel to be unloaded or loaded, as the case may be, a truck mounted on said tramway, and propelling, hoisting, and lowering mechanism operated by steam from a boiler mounted on said truck, whereby buckets of coal may be hoisted from beneath any portion of the tramway, conveyed to any other portion thereof, and lowered and discharged beneath it. For obtaining the most economic results I have specially devised some particular portions of my apparatus, and after fully describing the main features of my invention, and also certain devices and modifications of portions of said apparatus, the several features deemed novel will be specified in the several claims hereunto annexed.

Referring to the five sheets of drawings, Figure 1, Sheet 1, is a side elevation of a coal elevating and conveying apparatus embodying my invention as arranged for unloading a coal-barge lying at a dock.

Figure 1:
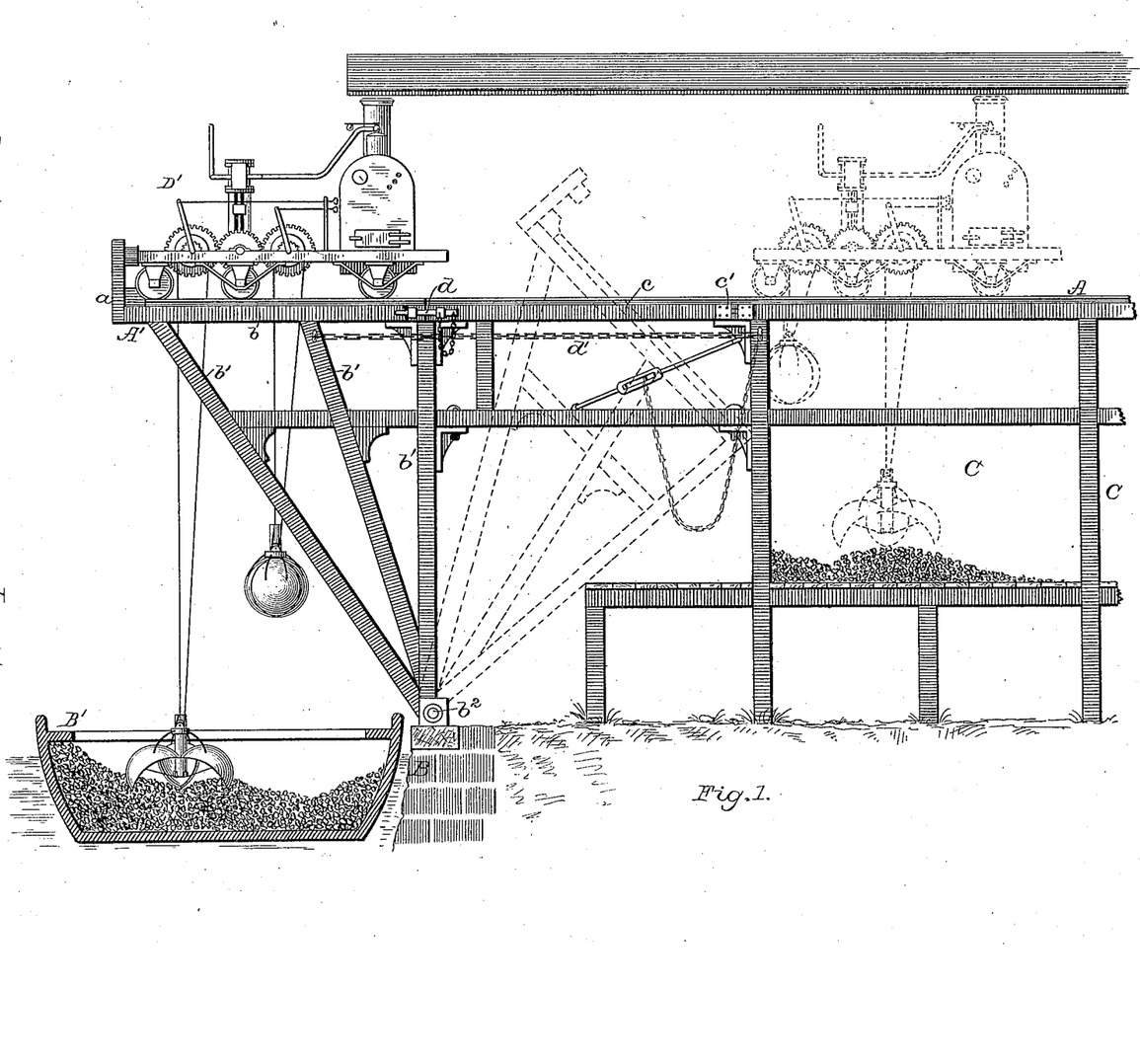
Figure 2:
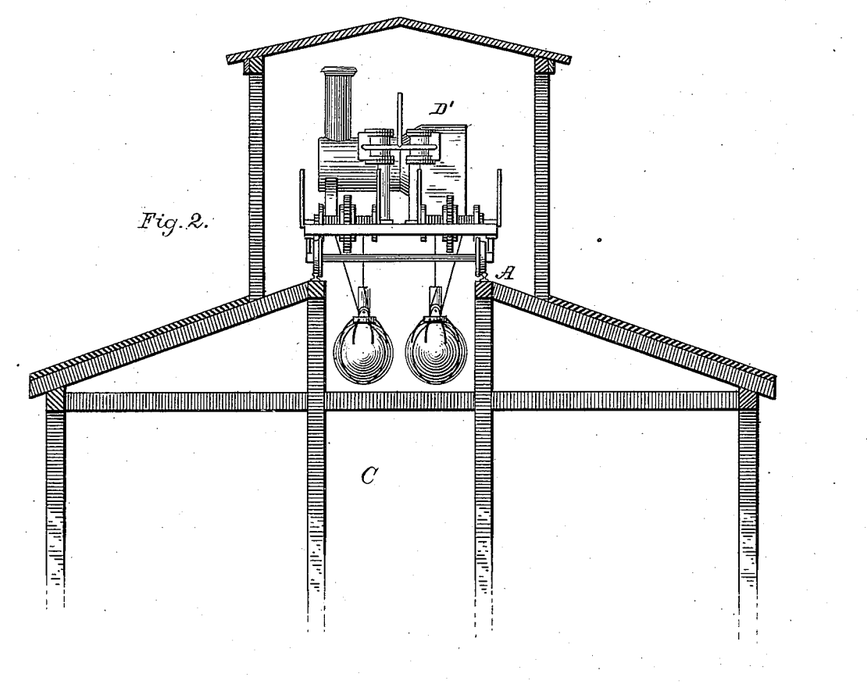
Fig. 2, Sheet 2, is an end view of the upper portion of said apparatus.

With reference to the elevated tramway A, it will be obvious that it will necessarily be varied somewhat in its construction and arrangement, according to the particular service desired and the character of the dock premises upon which it is employed. It is, however, to be understood that the overhanging terminus A' in some suitable form is an essential feature of said tramway. As shown in Fig. 1, it is arranged rectangularly to the front line of a dock, B, so that its terminus A' extends beyond or overhangs the front of the dock, so as to overlie a barge or other vessel, B'. To provide for the docking of a vessel having masts or smoke-stacks, the terminus A' is arranged so that it can be swung shoreward to allow the vessel to take position at the dock and thereafter to be again projected for service. It is not new to provide for a similar displacement of outrigged frame-work for use in hoisting coal, &c.; but I know of no prior horizontal tramway having its terminus thus arranged so that a hoisting-truck can operate above a vessel's hatchway. As here shown, the overhanging terminus A' is provided with stop-blocks or bulk-heads a, for limiting the outward movement of a truck on the tramway. The rails and bed-timbers b are firmly secured to and supported by heavy vertical and inclined steps or brace-timbers b', all of which at their lower ends are pivoted upon a heavy rod, $b^2$, on or near the cap-log of the dock. The main tramway at its connection with the movable terminus has rails and bed-timbers c, which are hinged by vertical pivots at their rear ends at c' to the adjacent ends of fixed rails and bed-timbers of the tramway, and at d, on each side of the tramway, there are locking-bolts which firmly connect the terminus and the rails and bed-timbers c. As thus constructed, it will be seen that by unlocking the bolts at d and swinging the outer ends of rails and bed-timbers c with the underlying brace-timber outwardly or laterally, the entire terminus can then be swung shoreward, as indicated in dotted lines. When forward in position for service, the movable terminus is held against undue outward movement by the keyed bolts d, and also by its chains d', one on each side, secured at one end to the trestle-timbers which support the elevated tramway; but any other suitable confining or locking devices may be employed. A light iron roof is provided for housing the tramway, preferably provided with hooded openings at short intervals, or with a continuous longitudinal opening similarly hooded.

Beneath the tramway, and generally throughout its length, are numerous separate large bins or pockets, C, into which coal is deposited, and for discharging their contents into cars or carts, they are usually well elevated and provided with chutes and gates for discharging their contents.

Figure 4:
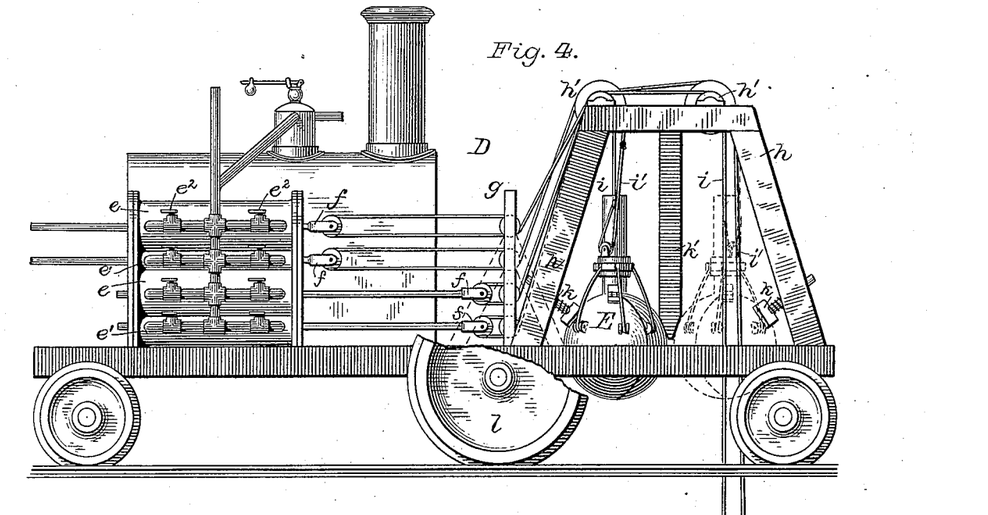
Figs. 4 and 5, Sheet 3, are, respectively, side elevations and plan views of one form of hoisting and conveying truck devised by me for the purposes indicated.
Figure 5:
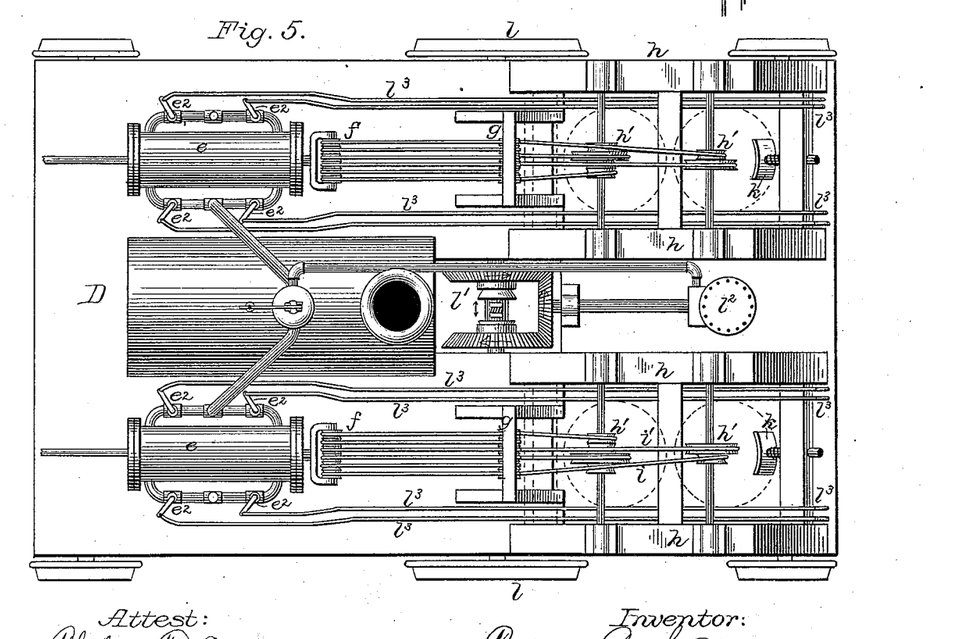

When the tramways are constructed for use with hoisting and conveying trucks of such construction as is illustrated in Figs. 1, 2, 6, and 7, the tramway should have its cross-braces, serving after the manner of ties to the rail-bed beams, considerably below the latter; but with trucks as illustrated in Figs. 4 and 5, said ties or braces may be located directly beneath the rail-bed beams, or they may be interposed between the rails and the bed-beams in the fixed portions of the tramway.

It will be understood that my trucks carry the coal in hoisting-buckets along the tramway, and I am therefore enabled for the first time to weigh coal in the bucket during its transit from the vessel to its bin or other place of deposit, and this I accomplish by mounting a section of the elevated tramway upon a trestle having its base upon the platform of suitable scales located at the surface of the ground, and it is obvious that said trestle need in no way obstruct the surface-entrance to the platform from the ground, thus enabling the scales to also serve for weighing carts and their contents, or even loaded rail-cars, if the said platform be provided in the usual manner with suitable rails.

In many localities it is desirable to unload cargoes from one barge or vessel to another, and for that purpose the dock should have two parallel fronts, and the elevated tramway should extend from one front to the other, and be provided with two of the overhanging movable termini A'.

For enabling two or more trucks to altertop of the truck, near one end thereof, and each is provided with a series of grooved sheaves, $h'$, these being arranged in pairs for the reception of the hoisting chain or line $i$ and discharging chain or line $i'$. Each of these lines, whether composed of wire or hemp or of metal links in the form of a chain, has one of its ends secured to the hoisting-bucket E, and its other end secured to the head-block $g$ or to the cross-head of the piston of its particular cylinder, after traversing the several sheaves or pulleys in a manner well known, and as indicated in the drawings. It is well known that with this system of applying power for hoisting, the distance traveled by the piston in each cylinder can be multiplied to any reasonable extent at the hoisting end of the line, and as the height of the hoist on a coal-dock need seldom be greater than, say, thirty feet, good results will be obtained by cylinders which permit their pistons to travel five feet, in proportion as one is to six. Under most circumstances the weight of the unloaded bucket will be sufficient to overcome the friction of the pulleys and pistons; but steam may also be employed on the lowering side of the piston, if need be, for accelerating the lowering movement.

It will be understood that the small steam-cylinders $e'$ serve to work the lines $i'$, by which automatic buckets are operated—as, for instance, assuming the buckets to be empty and about to be lowered, both cylinders in one or more pairs are permitted to exhaust the steam contained therein until each bucket has nearly reached the surface of the coal in the vessel's-hold, whereupon in each case the steam from the small cylinder is checked, thus causing a brief holding back of the line $i'$, whereupon both lines then move downward together, and the bucket, being then wide open, reaches and rests upon the mass of coal. When steam is next admitted into the large cylinder, the hoisting-line $i$ causes the bucket to close and fill itself with coal, and then the small cylinder takes its steam for taking up the slack of line $i'$, at the same rate of speed, until the bucket has been elevated slightly above the level of the tramway-rails, as indicated in Fig. 4, at which point it is confined against undue swaying to and fro by contact with oppositely-located buffers $k\,k'$. The buffers $k$ are each mounted on a yielding stem, and are backed up by an expansive spiral spring; but the buffer $k'$ serves for both buckets, it being a slightly-yielding pendent bar, of wood, and having at its lower end two concave faces, so that each bucket will be held, when fully hoisted, between one face of said bar and one spring-buffer. When each trestle is arranged for one bucket only, two spring-stem buffers $k$ are preferably employed, although it is obvious that the pendent bar $k'$, being laterally yielding at its lower end, performs the service of a spring-buffer with reference to either of the buckets and as an interposed abutment when both buckets are fully hoisted.

It will be readily seen that any of the well-known sectional and automatically opened and closed buckets requiring the hoisting and the discharging or opening lines can thus be operated. It will also be readily seen that if ordinary buckets are used only the large cylinders will be required. The pressure of steam within the large cylinders can be maintained for holding the bucket during its transit, or any suitable clamping device may be applied to the hoisting-line, or a locking device can be applied to the rear ends of the piston-rods, which extend through the rear heads of the cylinders. It is important, however, that if such a clamping or locking device be used it be equally accessible for operation by the engineer, as are the rods by which the cylinder valves or cocks are worked.

The truck having, as described, hoisted its load of, say, four buckets each readily carrying a ton of coal, is ready for conveying it to any point on the elevated tramway. Various forms of propelling mechanism can obviously be applied—as, for instance, a cable secured at opposite ends of the tramway. If wound around a pulley on the truck, said pulley, when rotated, as by a small steam-engine, will cause the truck to move along the tramway in a manner well known. I have, however, shown in Figs. 4 and 5 the truck provided with a pair of driving-wheels, $l$, gearing $l'$, and clutch, of a well-known type, and a small steam-engine, $l^2$, for driving the truck, the double gearing and clutch enabling the truck to be driven in either direction. For checking the speed of the truck and stopping it, ordinary breaking mechanism may be employed in the usual manner.

As seen in Fig. 5, the steam valves or cocks $e^2$ of the several cylinders are provided with rods $l^3$, which extend to the opposite end of the truck, so that the operator can, while occupying a position above either pair of the buckets, properly work any of the valves of the two sets of cylinders which are connected with said buckets. The propelling-engine $l^2$ is also conveniently accessible, thus rendering it unnecessary for the engineer or operator to at any time neglect the supervision of the buckets, if the boiler and its fire be attended by a fireman stationed at the opposite end of the truck.

Figure 3:
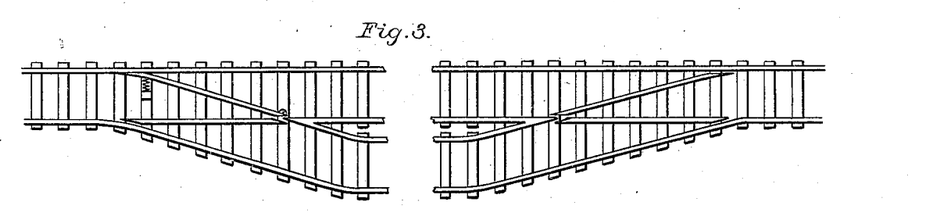
Fig. 3, Sheet 2, is a modification of the elevated tramway in plan, arranged for the successive operation of two or more trucks in hoisting from one hatchway or one pile of coal.
Figure 6:
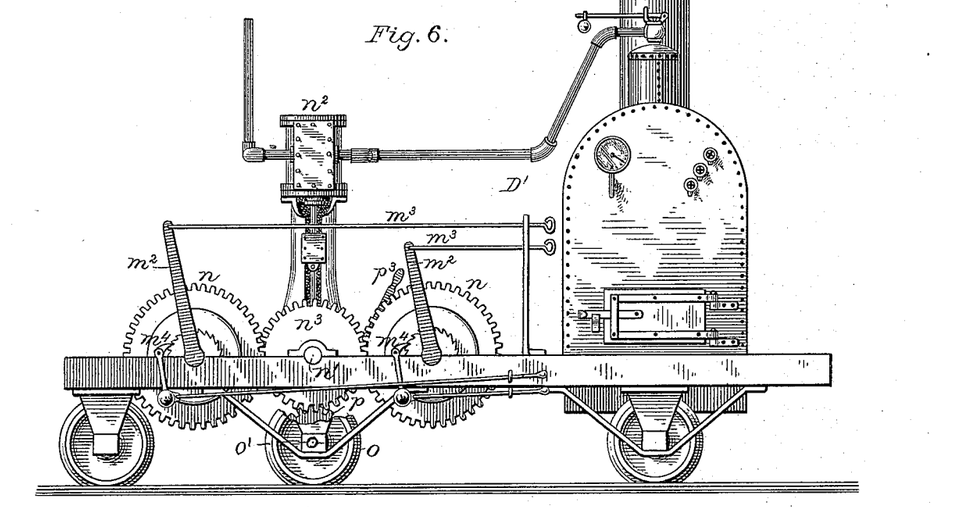
Figs. 6 and 7, Sheet 4, are similar views of a hoisting and conveying truck of different construction, devised by me as a substitute for the truck shown in Figs. 4 and 5.
Figure 7:
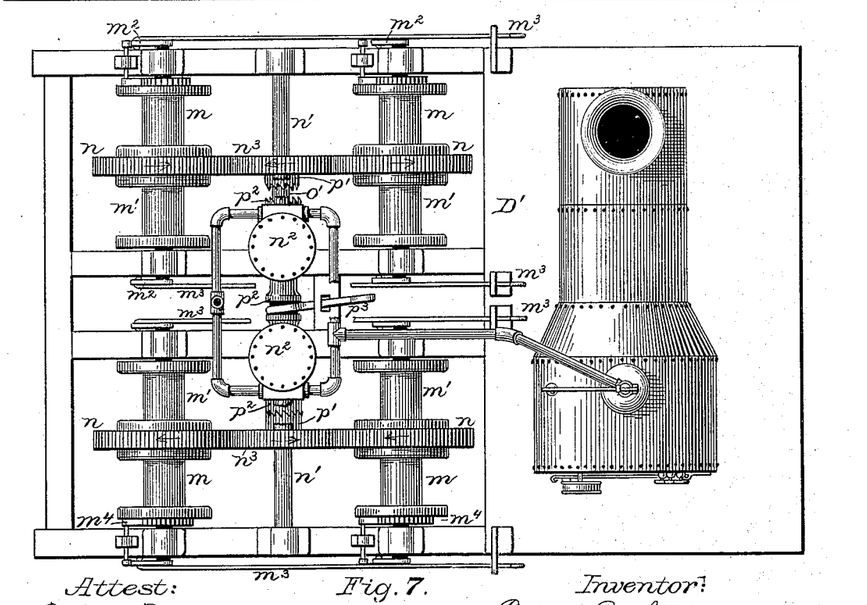
Figures 8, 9:
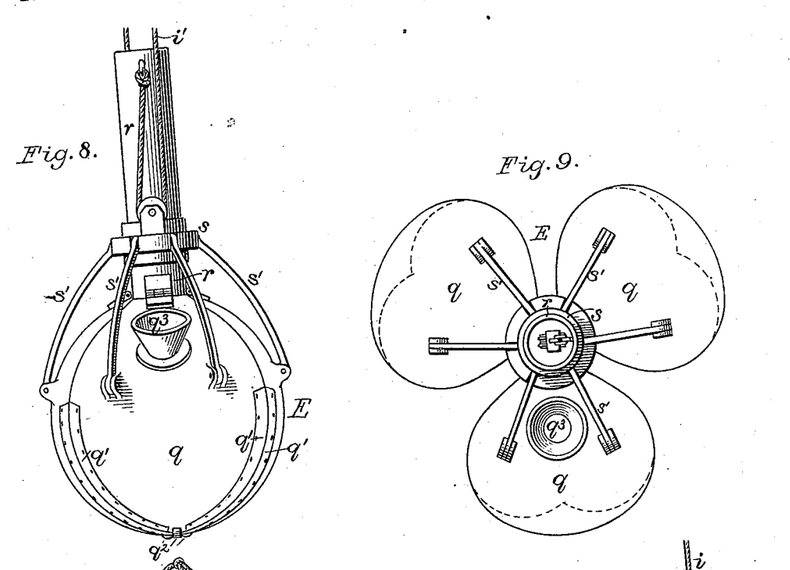
Figs. 8 to 11, inclusive, Sheet 5, are views of a sectional coal-bucket devised by me, respectively in side view closed, top view open, side view open, and in partial central vertical section. Said bucket forms the subject of a separate application for Letters Patent, and is not herein claimed.
Figure 10:
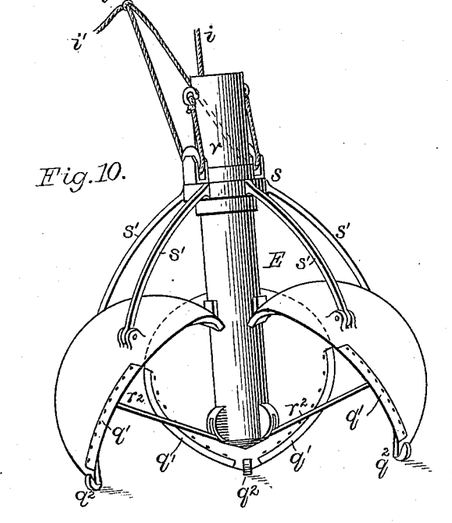
Figure 11:
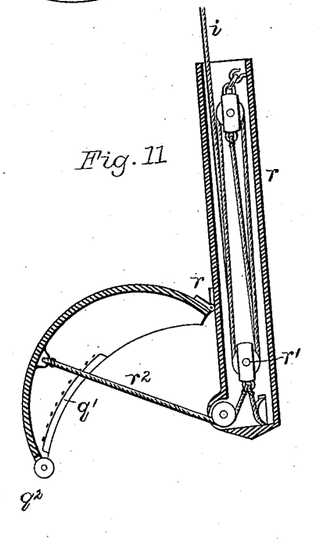

The hoisting and conveying truck D' shown in Figs. 6 and 7 embodies winches or windlasses, which, separately considered, are similar to others heretofore used for ordinary hoisting service. Although this truck has no elevated frame, as previously described, it is obvious that such a frame can be mounted thereon, the lines, ropes, or chains in that case being carried from the windlasses over pulleys or sheaves suspended from the top of said frame. Having no elevated frame, this truck carries its buckets suspended considerably below the level of the tramway, and to prevent undue swaying of the buckets, when thus suspended, buffers may be used, as before denately operate at the same terminus, I provide an additional elevated tramway or side track, as illustrated in Fig. 3, provided with suitable switches in a manner well known, whereby said trucks may pass each other, and also whereby a truck may discharge its buckets from the side track into carts or cars, a track or roadway being provided beneath said side track which in that case would extend outside of the range of bins or pockets beneath the main tramway. The employment of such a side track and switches obviously requires a truck capable of hoisting the buckets above the level of the tracks, as illustrated in Figs. 4 and 5.

I have illustrated two distinct forms or varieties of hoisting and conveying trucks for use on the elevated tramway; but it is to be understood that said trucks may be almost indefinitely varied in their construction and mode of operation without departure from certain features of my invention, as it is only necessary that they shall carry their own propelling power and hoisting mechanism, adapted to hoist and lower one or more coal-buckets, and to carry them from point to point on the tramway. When the buckets are of the ordinary or simple types, ordinary steam-windlasses, with well-known braking and controlling mechanism, need only be employed; but when the automatic or self-filling buckets of the sectional or "clam-shell" variety are used, extra windlasses or equivalent mechanism becomes necessary for closing and opening said buckets for loading and discharging. The trucks shown are each adapted to work four buckets of the automatic class, and as each of the latter can readily be relied upon for handling a ton of coal, the trucks at each trip can carry about four tons, first hoisting the coal from a hatchway, and then, after due conveyance, lowering it and discharging it into a pocket or car without breakage or undue abrasion, or other injury thereto. Said trucks, as shown, are provided also with steam-propelling mechanism; but it is to be understood that well-known propelling mechanism other than that illustrated may be employed without departure from certain features of my invention.

Apparatus employed in excavating for sewers and line-cuts has heretofore embodied a movable platform having elevated rails supporting a rail-truck thereon, and a steam hoisting truck mounted upon said rail-truck, and provided with hoisting-windlass and bucket, so that earth could be lifted from a sewer-excavation — for instance, by a bucket — and carried on the rail-truck by the hoisting-bucket in a straight line to the length of the rail-truck, for filling in where the sewer was completed; or said earth could be carried laterally from the line of excavation by the rail-truck moving sidewise on the elevated rails of the movable platform, and carrying bodily both the hoisting-truck and the bucket. Said prior apparatus had, however, no overhanging terminus upon which the hoisting-truck could be located for hoisting from a vessel's hold, and said hoisting-truck was limited in its movements on its rails to the length of the rail-truck on which said hoisting-truck was mounted, and said rail-truck was also limited in length to the length of the movable platform, which supported the rectangularly-arranged rails upon which the rail-truck itself was mounted, thus obviously rendering said apparatus incapable of performing the service for which my apparatus is intended. In said prior excavating apparatus the hoisting-truck was self-propelling on the rail-truck, and it also propelled the rail-truck sidewise; but its capacity for movement on the rail-truck was limited in one direction to the length of a splined shaft carried by the rail-truck, and in the other direction it was limited to the width of the movable platform; and it is to be understood, therefore, that I do not broadly claim the combination of an elevated tramway and a self-propelling hoisting-truck. With my stationary elevated tramway, having the overhanging terminus, said prior hoisting-truck might be employed with fair results, and at one or more points in my tramway rail-trucks and rails at right angles to my tramway, as in said prior excavating apparatus for supporting said rail-truck, could be used to good advantage for laterally transporting a loaded truck bodily from one stationary tramway to another, without departure from my invention. I have, however, devised hoisting-trucks which are specially suited for my purpose.

The hoisting and conveying truck D, illustrated in Figs. 4 and 5, is believed to involve many novel features, although it operates upon well-known principles heretofore applied to stationary elevating and hoisting apparatus as used in buildings, hotels, &c. A complete detailed description of the operating mechanism is deemed unnecessary for the purposes of this specification, it being my intention to make the same the subject of a separate application for Letters Patent, to be hereafter filed by me. It is to be understood, however, that this truck is provided with a steam-boiler and with hoisting mechanism, by which four buckets, E, can be worked, and that for each bucket a large steam-cylinder, $e$, and a smaller one, $e'$, are employed. Each of these cylinders contains a piston and piston-rod, and they are each, near the ends thereof, provided with steam and exhaust valves or cocks $e^2$, whereby steam is admitted for forcing the pistons rearward for hoisting, and exhausted for permitting said pistons to move forward for lowering. Each piston-rod at its front end carries a cross-head, $f$, in which numerous grooved sheaves or pulleys are loosely mounted, and in suitable standards or stationary head-blocks, $g$, other similar sheaves or pulleys are loosely mounted. A pair of vertical scaffolds or frames, $h$, are mounted on scribed; but in this case the frames or braces supporting the buffers would necessarily project downwardly from the truck and toward each other.

Four pairs of drums are shown, and each pair includes a drum, $m$, for the main or hoisting line, and a drum, $m'$, for the discharging-line, if an automatic bucket be employed. The drums are loosely mounted on their respective shafts or axles, but are provided with clutches operated by levers, $m^2$, by which the drums may be rotatively connected with said shafts in a manner well known. Each drum-shaft has a gear, $n$, keyed thereto, which meshes with a gear, $n^3$, on one of the two crank-shafts $n'$, each of which is coupled to and driven by one of the engines $n^2$. The clutch-levers $m^2$ have hand-rods $m^3$, extending toward the boiler, so that either or all of them may be conveniently accessible to the engineer or operator, while occupying a position favorable to the overlooking of all the drums and the buckets. The usual pawls and ratchets, $m^4$, are also employed for enabling the hoisting-drums $m$ to hold their load when unclutched from their axles.

It will be assumed that the truck is at an overhanging terminus of the tramway, and that the steam-engines are at rest, and that all the buckets are empty and ready to be lowered. Either or all of the four pairs of drums are then released, permitting the buckets to drop until at the proper point, when either or all of the drums $m'$ are checked by the usual brakes, whereupon the buckets are opened, and then permitted to descend upon the coal. The cylinders or engines are then started, the hoisting-drums $m$ clutched or connected to their axles, followed by clutching the drums $m'$ to their axles until the hoisting is accomplished, whereupon the two drums are unclutched, the hoisting-drums having been meanwhile properly locked by their ratchets and pawls.

The truck is propelled by the same steam-engines. It will be seen that the truck has a pair of driving-wheels, $o$, and that on the driving-wheel shaft $o'$ there are two gears, one of which is shown at $p$ in Fig. 6, and that these gears $p$ respectively underlie and mesh with the gears $n^3$ on the crank-shafts $n'$. These gears $p$ are loosely mounted on the driving-wheel axle, but are provided with clutch-faces $p'$ on the coincident sides thereof. On said wheel-axle, between said clutch-faces, there is also a sliding clutch, $p^2$, splined to the axle, and provided with a shipping-lever, $p^3$. The engines being arranged to operate in opposite directions, it is obvious that the gears $p$ must loosely revolve in opposite directions on the driving-wheel axle, and that by throwing the clutch in one direction or the other the truck will be moved forward or backward, as the case may be. In Fig. 7, the two crank-shafts $n'$ are broken away near the engines, to disclose the underlying driving-wheel axle and the clutching mechanism.

Brakes of the usual type may be advantageously employed for stopping the truck, although it is obvious that high speed is not contemplated, and that the steam-engines, if provided, as contemplated, with reversing-gear of the usual character, can be largely relied upon for controlling the movements of the truck. It is obvious that various other well-known arrangements of gearing may be employed for driving the truck or operating the drums, and that both lines of service may, if desired, be performed by one steam-engine instead of two. The trucks, as a rule, should be inclosed by light cabs, preferably of sheet-iron, for properly protecting the attendants and machinery from the weather. The smoke-stacks should be well screened, and I deem it advisable that they should project slightly above the roof of the tramway, through a long longitudinal opening therein, provided with covers to be used when the trucks are out of service.

I have already stated that ordinary hoisting-buckets may be used in accordance with certain features of my invention, as well as such as are filled and discharged automatically; but I have devised a bucket of this latter class which is well adapted for handling coal in accordance with the main features of my invention. Said novel bucket, however, forms no part of my present invention, but is described and claimed in a separate application for Letters Patent filed by me. I have, however, for the purpose of showing the construction, and also the mode of operation of my improved bucket in connection with the novel hoisting and conveying apparatus herein described, fully illustrated said bucket in Figs. 8 to 11, inclusive, of the drawings.

My novel bucket is constructed in a completely spherical or globular form, and in such manner as to permit it to be filled without liability of dropping any of the coal while being hoisted and conveyed. As shown in the drawings, the bucket is composed of three half-circular sections, $q$, each of which is one-third of a globular shell, and hinged at its upper end to a tube or neck, $r$. The lower edges of the sections are re-enforced, as heretofore in other forms of dredging-buckets, by removable sharp-edged knife-plates $q'$, for protection against wear. Said sections are also, as heretofore in other forms of buckets, each provided at its lower end with a small roller or friction-wheel, $q^2$, to protect the planking of a vessel from injury. To a sheave, at $r'$, the several wire cords or chains $r^2$ are connected, each being attached to the interior of a bucket-section. The hoisting-line $i$ is rigged through the sheaves within the tubular neck. The bucket-sections $q$ are moved on their hinges and opened and closed by the discharging-line $i'$, attached to the opposite sides of a runner or ring, $s$, the latter sliding on the neck $r$, and connected by pivots and links $s'$ to all of the bucket-sections. Whenever necessary, the bucket, while closed, may be filled by hand, through an opening provided with a funnel, $q^3$, near the upper end of one or more of the sections.

Either form of truck can be readily operated by one man, although I prefer that two men be employed thereon, one for attending to the boiler and the other to the operation of the hoisting mechanism; and it will be seen that when the truck is over a vessel's hatchway, the operator has all of the buckets directly beneath his eye at all times, thus enabling him to work them safely and to the best possible advantage, and with a minimum liability of accident to workmen in the hold of the vessel, and that during the transit of the truck and lowering the buckets for discharging the same critical supervision can always be had.

Having thus described my invention, I claim as new and desire to secure by Letters Patent—

1. The combination, substantially as hereinbefore described, of an elevated tramway having an overhanging terminus projecting beyond the front of a dock, a truck mounted on said tramway, and propelling, hoisting, and lowering mechanism, and buckets mounted upon and carried by said truck and operated by steam from a boiler carried thereon, substantially as described, whereby coal can be hoisted in said buckets from beneath the terminus, and conveyed to any other portion of said tramway and deposited beneath it without breakage, as set forth.

2. The combination, substantially as hereinbefore described, of an elevated tramway, a truck, one or more automatic buckets, a hoisting and a discharging line for each bucket, and independent hoisting and lowering mechanism for each of said lines, whereby either or all of the buckets can be automatically filled, hoisted, and conveyed in a suspended condition by the truck along the tramway, lowered, and automatically discharged, as set forth.

3. The combination, substantially as hereinbefore described, of an elevated tramway, a truck mounted thereon, mechanism, substantially as described, for hoisting and lowering a coal-bucket, and buffers for maintaining contact with said bucket while in transit with and suspended from said truck.

ROBERT B. LITTLE.

Witnesses:
W. S. FIFIELD,
HENRY F. ANTHONY.